United States Patent [19]

Basavanhally et al.

[11] Patent Number: 5,281,884
[45] Date of Patent: Jan. 25, 1994

[54] ADJUSTABLE X-Y STAGE

[75] Inventors: Nagesh R. Basavanhally, Trenton, N.J.; Kenneth H. Billingham, Feasterville, Pa.

[73] Assignee: AT&T Bell Laboratories, Murray Hill, N.J.

[21] Appl. No.: 892,912

[22] Filed: Jun. 3, 1992

[51] Int. Cl.$^5$ .......................................... H01L 41/08
[52] U.S. Cl. .................................. 310/328; 310/331; 385/137; 356/350
[58] Field of Search ............... 310/328, 331; 318/577; 356/350; 385/137

[56] References Cited

U.S. PATENT DOCUMENTS

| | | | |
|---|---|---|---|
| 3,046,006 | 4/1960 | Kulicke, Jr. | 269/60 |
| 3,146,367 | 8/1964 | McNaney | 310/328 |
| 3,343,959 | 10/1963 | Walsh | 350/310 |
| 3,786,332 | 1/1974 | Hepner et al. | 318/577 |
| 3,887,811 | 6/1975 | Livesay | 29/578 |
| 4,012,030 | 3/1977 | Hesselgren | 269/60 |
| 4,193,317 | 3/1980 | Oono et al. | 74/479 |
| 4,385,373 | 5/1983 | Howe | 369/44.15 |
| 4,455,501 | 6/1984 | Tojo et al. | 310/328 |
| 4,578,607 | 3/1986 | Tojo et al. | 310/328 |
| 4,615,591 | 10/1986 | Smith et al. | 350/507 |
| 4,686,440 | 8/1987 | Hatamura | 318/646 |
| 4,790,647 | 12/1988 | Kozma | 356/350 |
| 5,063,321 | 11/1991 | Carter | 310/323 |
| 5,185,846 | 2/1993 | Basavanhally et al. | 385/137 |

FOREIGN PATENT DOCUMENTS

| | | | |
|---|---|---|---|
| 0187912 | 8/1987 | Japan | 310/328 |
| 0214414 | 9/1987 | Japan | 310/331 |

OTHER PUBLICATIONS

"Fine Adjustments for Optical Alignment", R. S. Reiss, SPIE Optical Alignment III, vol. 608, 1986, pp. 63-69.
G. F. Benedict, "Electrical Discharge Wire Cutting (EDWC)," Chapter 16 in Nontraditional Manufacturing Processes, edited by Marcel Dekker, Inc., pp. 231-246.
"Technique for Monolithic Fabrication of Microlens Arrays," Z. D. Popovic et al., Applied Optics, vol. 27, No. 7, Apr. 1, 1988, pp. 1281-1284.
"Flexure Mounts," SPIE, Optomechanical and Electro-Optical Design of Industrial Systems, vol. 959, 1988.

Primary Examiner—Mark O. Budd
Assistant Examiner—Thomas M. Dougherty
Attorney, Agent, or Firm—Roderick B. Anderson

[57] ABSTRACT

An adjustable X-Y stage (10) comprises a single monolithic member from which regions have been cut to define a central mounting portion (19), a peripheral frame portion (20) a plurality of moveable portions (21), each located between the central mounting portion and the peripheral frame portion, a plurality of first spring portions (22), each interconnecting one of the moveable portions to the central mounting portion, and a plurality of second spring portions (23), each being adjacent a moveable portion and each interconnecting the peripheral frame portion to the central mounting portion. A plurality of screws (12-15), each adapted to extend through the peripheral frame portion (20), engages one of the moveable portions (21) to permit adjustments of the central mounting portion (19) in transverse X and Y directions.

9 Claims, 2 Drawing Sheets

ADJUSTABLE X-Y STAGE

TECHNICAL FIELD

This invention relates to X-Y stages and, more particularly, to adjustable X-Y stages with which microscopic adjustments can be made.

BACKGROUND OF THE INVENTION

As greater use of photonics devices is made for such purposes as optical communications and optical computing, there has developed a demand for components that can aid in the assembly of apparatus used in such systems. It has long been recognized that appropriate packaging apparatus must be developed which will aid in the assembly of photonics and optical components with relative alignments that are extremely precise. For example, it is not uncommon that lasers or laser arrays must be packaged with alignment tolerances that are accurate to within one or less than one micron. The copending application of Basavanhally et al., Ser. No. 07/705,229, filed May 24, 1991, describes the need for accurately aligned optical fiber bundles. Photodetectors, photodetector arrays, lens arrays, mirrors, and other optical devices all perform various functions within optical systems and may require great precision in their alignment within packages.

There is a great deal of literature concerning general adjustment of optical devices, but comparatively little concerning adjustments with tolerances in the micron or sub-micron range. When such high precision is required, friction between component elements usually leads to nonlinearities due to sticking and slipping motions, hysteresis, wear, and other factors. Flexture structures have been proposed for avoiding some of such nonlinearities, but such structures usually do not provide X direction motion that is completely independent of Y direction motion. Piezoelectric elements have been used to give small incremental movements, but it would often be useful for such small movements to be accurately deamplified.

Accordingly, there is a continuing long-felt need for methods and apparatus that permit optical and photonics devices to be packaged within X-Y adjustment stages with X and Y direction alignment tolerances in the micron or sub-micron range, and which are relatively simple to use.

SUMMARY OF THE INVENTION

In accordance with an illustrative embodiment of the invention, an adjustable X-Y stage comprises a single monolithic member from which regions have been cut to define (1) a central mounting portion, (2) a peripheral frame portion, (3) a plurality of moveable portions, each located between the central mounting portion and the peripheral frame portion, (4) a plurality of first spring portions, each interconnecting one of the moveable portions to the central mounting portion, and (5) a plurality of second spring portions, each being adjacent a moveable portion and each interconnecting the peripheral frame portion to the central mounting portion. Illustratively, a plurality of screws, each adapted to extend through the peripheral frame portion, engages one of the moveable portions to permit adjustments of the central mounting portion in transverse directions.

In the illustrative embodiment, the device contains four moveable portions symmetrically arranged with respect to the center of the central mounting portion, with four screws, each extending substantially radially with respect to the center of the central mounting portion. A device to be aligned is contained on the central mounting portion. Two first spring portions interconnect opposite sides of each moveable portion of the central mounting portion, and two second spring portions interconnect the central mounting portion to the peripheral frame portion on opposite sides of each moveable portion. Inward movement of a screw then compresses each of the first spring portions and tenses each of the second spring portions associated with that screw. Adjustment of two orthogonal screws gives orthogonal X-Y adjustments. After the adjustment has been made, the remaining two screws can be firmly abutted to adjacent moveable portions to lock the central mounting portion in place. An elastomeric material such as silicone can be used to fill the open regions of the monolithic member, either before or after the proper adjustment has been made, and thereafter the entire member may be used as part of a package for containing an optical device mounted on the central mounting portion.

Because the X-Y stage is made from a single monolithic member, all movements result from flextures of part of the monolithic element, and such movements can easily be made to fall within the linear elastic range of the member. This avoids problems such as nonlinearities, hysteresis, and stick-slip motion encountered by conventional devices using, for example, conventional piezoelectric stages or mechanically driven stages.

These and other objects, features, and benefits of the invention will be better understood from a consideration of the following detailed description taking in conjunction with the accompanying drawing.

DETAILED DESCRIPTION

Figure 1:
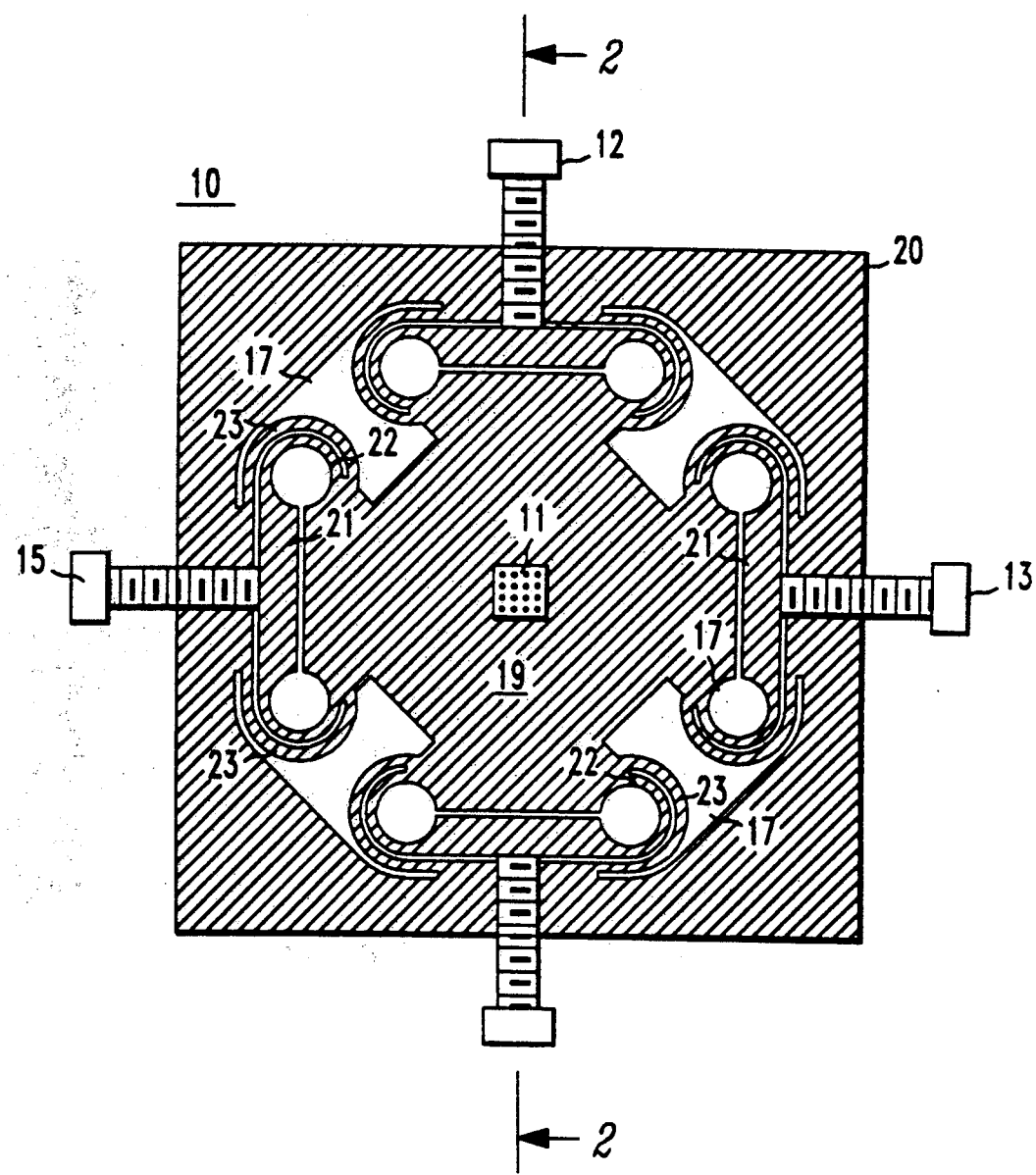
FIG. 1 is a front view of an adjustable X-Y stage in accordance with an illustrative embodiment of the invention.
Figure 2:
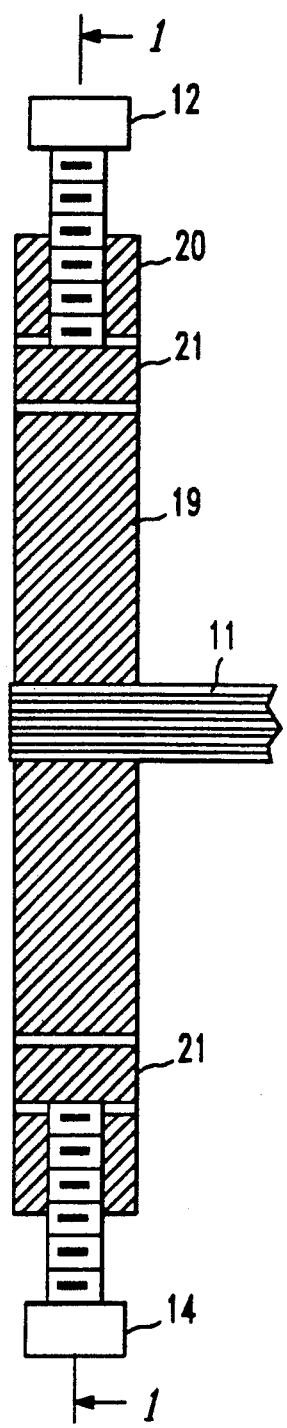
FIG. 2 is a view taken along lines 2—2 of FIG. 1.

Referring now to FIGS. 1 and 2, there is shown an illustrative embodiment of the invention comprising an X-Y adjustable stage 10 upon which is mounted an array 11 of optical fibers. The purpose of the apparatus is to align the optical fiber array 11 by means of adjusting screws 12-15. The optical fiber array can be made by the method described in the aforementioned Basavanhally et al. patent application, which describes how the component optical fiber ends can be aligned in a matrix configuration to tolerances within micron or sub-micron dimensions. If the optical fiber matrix is to be used in a free-space photonics switch as was described in the application, it is necessary, not only to align the individual optical fibers of the array, but also to align the array with other optical apparatus, again to within micron or sub-micron tolerances. The X-Y stage 10 constitutes apparatus for mounting the optical fiber array, allowing final fine adjustments in the X-Y position of the array to be made, and which thereafter may constitute a part of the permanent package within which the optical fiber array is utilized.

In accordance with the invention, the stage 10 (except for the screws) is made from a single workpiece of linear elastic material such as spring steel or copper-beryllium. From this single monolithic structure is cut regions 17 to define a central mounting portion 19, a peripheral frame portion 20, a plurality of moveable portions 21, each located between the central mounting portion 19 and the frame portion 20, a plurality of first spring portions 22, each interconnecting one of the moveable portions to the central mounting portion, and a plurality of second spring portions 23, each being adjacent a moveable portion and each interconnecting the peripheral frame portion to the central mounting portion. The regions 17 are preferably removed from a single workpiece by electron discharging machining, a known process in which an electrical wire defines a line to be cut by forming an electrical discharge; see, e.g., "Nontraditional Manufacturing Processes," by G. F. Benedict, Marcel Dekker, Inc., New York and Basel, Switzerland, pp. 231-245. The workpiece is moved with respect to the electrical discharge such that the wire cuts the workpiece in the manner of a jigsaw.

It should be noted that the cuts are made such that each first spring portion 22 nests within a second spring portion 23 with both of the spring portions being in the shape of an arc of a circle having a common center of curvature. After the electrical discharge machining, four threaded apertures for containing screws 12-15 are made in the peripheral frame portion 20, the openings being radially extending and located in quadrature as shown. As can be seen more clearly in FIG. 2, screws 12-15 are then screwed into the apertures such that they can abut against one of the moveable portions 21.

In using the X-Y stage 10 to align the optical fiber bundle 11, one may first back two of the screws such as screws 14 and 15 to be out of contact from their corresponding moveable portions 21. Then, screws 12 and 13 are moved in or out to give independent X and Y movement to the central mounting portion 19. For example, screwing screw 12 into the aperture causes downward or Y direction movement on the moveable portion 21 and also on the central portion 19. As the downward motion progresses, the first spring portions 22 associated with screw 12 are compressed, while the second spring portions 23 associated with that screw are placed in tension. As a consequence, the axial motion of the screw is translated through two sets of springs to give motion to the central mounting member 19. The axial motion of the screw is thereby significantly and desirably deamplified or reduced. With spring steel thicknesses of thirteen to twenty-eight mils, the percent reduction in axial motion is typically between fourteen and twenty-three percent.

After the Y direction adjustment, X direction adjustment may be made by screwing screw 13 in or out, such movement again being deamplified as described above. After adjustment in both directions, screws 14 and 15 may be screwed axially inwardly to abut against corresponding moveable portions 21 to give firm symmetrical support on all sides of the central mounting portion. Either before or after adjustment, the open regions 17 can be filled with a damping material for reducing vibration during operation. The vibration damping material may be silicone or other rubber-like material.

The X-Y stage shown in FIG. 1 has been made from stainless steel having dimensions 1⅝ inch × 1⅝ inch × 3/16 inches. It was found that microscopically small and accurate movements of less than one micron could be made by adjusting the screws and simultaneously observing them through a microscope. In the model that was made, the optical fiber bundle 11 was not mounted in the central mounting portion 19, but rather a spot on the central mounting portion was observed for experimental purposes. Movements of from a fraction of a micron to several microns easily fall within the linear elastic range of the stainless steel that was used. Since all of the elements are made of a single monolithic member, all movements result from flexure of portions of that member. This avoids problems such as nonlinearities, hysteresis, and relative motion of different parts, as are encountered by conventional devices. Adjustments in one direction do not affect alignment in the other direction; that is, the X and Y adjustments are independent of each other.

Figure 3:
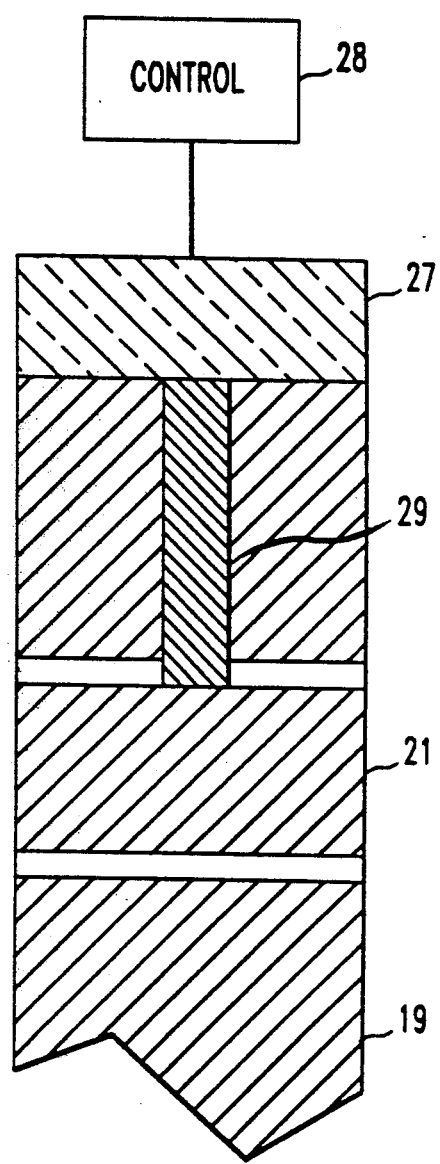
FIG. 3 is a sectional schematic view showing an alternative adjustment member that may be used in the apparatus of FIG. 1.

The use of screws result in inherent problems of wear and "backlash" which can be avoided by using piezoelectric actuated elements instead of screws. This is illustrated in FIG. 3, in which a piezoelectric element 27 is used in place of screw 12. The piezoelectric element is expanded or contracted in the Y direction by an electronic control 28 which applies Y direction force on a plunger element 29 that bears against the moveable portion 22. Referring to FIG. 1, all four screws 12-15 are preferably replaced by piezoelectric elements as illustrated in FIG. 3. Alternately, only screws 12 and 13 could be replaced by piezoelectric elements, since screws 14 and 15 are used merely for providing mechanical support rather than for adjustment purposes.

From the foregoing, it can be appreciated that the adjustable X-Y stage can be used for supporting photodetectors, photodetector arrays, lens arrays, mirrors, and other optical devices which may require great precision in their alignment within a package. After alignment has been performed, it is foreseen that the X-Y stage 10 would then constitute part of the package in which the mounted apparatus is to be used. Alternatively of course, the adjustable X-Y stage can be used for laboratory purposes or for whatever other purposes are required for obtaining extremely small adjustments of whatever devices may be under observation. These and other embodiments and modifications may be made by those skilled in the art without departing from the spirit and scope of the invention.

We claim:

1. An adjustable stage comprising:
   a central mounting portion;
   a peripheral frame portion surrounding the central mounting portion;
   a plurality of movable portions each located between the peripheral frame portion with the central mounting portion;
   two first spring portions interconnecting opposite ends of each moveable portion with the central mounting portion;
   one second spring portion located adjacent each first spring portion and directly connecting the central mounting portion with the peripheral frame portion, each of said second spring portions being out of contact with any of the moveable portions;
   and a plurality of adjustment members, each adapted to extend through the peripheral frame portion to engage and exert a force on one of the moveable portions, thereby to exert a small force on the central mounting portion.

2. The adjustable stage of claim 1 wherein:
   the central portion has a geometric center;

each adjustment member exerts a substantially radial force with respect to said center of the central mounting portion;

and the moveable portions are substantially symmetrically arranged with respect to the center of the central mounting portion.

3. The adjustable stage of claim 2 wherein:

each of the first spring portions constitutes a compressive spring that is placed in increased compression when an adjustment member associated therewith exerts a radially inwardly directed force;

and each of the second spring portions constitutes a tensile spring that is placed in increased tension when an adjustment member associated therewith exerts a radially inwardly directed force.

4. The adjustable stage of claim 2 wherein:

the central mounting portion, the peripheral frame portion, the plurality of moveable portions, and the first and second spring portions are all made from a single monolithic member;

the first and second spring portions are each substantially in the shape of a semicircle;

and each first spring portion nests within a second spring portion.

5. The adjustable stage of claim 4 wherein:

the monolithic member is a metal having a substantially linear elastic range over the range of forces applied by the adjustment members.

6. The adjustable stage of claim 2 wherein:

four moveable portions are substantially symmetrically arranged around the central mounting portion;

and four adjustment members engage each moveable portion, whereby X and Y adjustments of the central mounting portion may be made by radially moving the first and second adjustment members located at substantially mutually perpendicular angles, and thereafter adjusting third and fourth adjustment members to stabilize the position of the central mounting portion.

7. The adjustable stage of claim 6 wherein:

substantially all spaces within said monolithic member are substantially filled with an elastomeric material.

8. The adjustable stage of claim 6 wherein:

all of the adjustment members are screws.

9. The adjustable stage of claim 6 wherein:

at least two of the adjustable members are piezoelectrically driven members.

* * * * *

UNITED STATES PATENT AND TRADEMARK OFFICE
CERTIFICATE OF CORRECTION

PATENT NO. : 5,281,884

DATED : January 25, 1994

INVENTOR(S) : N.R. Basavanhally and K.H. Billingham

It is certified that error appears in the above-identified patent and that said Letters Patent is hereby corrected as shown below:

Column 4, line 52 "with" should read --and--.

Column 5, line 16 "2" should read --3--.

Signed and Sealed this

Twenty-first Day of June, 1994

Attest:

BRUCE LEHMAN

Attesting Officer        Commissioner of Patents and Trademarks